United States Patent [19]

Dussert et al.

[11] Patent Number: 5,466,378
[45] Date of Patent: * Nov. 14, 1995

[54] OXIDIZED ACTIVATED CARBON FOR THE CONTROL OF PH AND ALKALINITY IN WATER TREATMENT APPLICATIONS

[75] Inventors: Bertrand W. Dussert, Pittsburgh; Richard W. Farmer, Gibsonia; Richard A. Hayden, Pittsburgh, all of Pa.

[73] Assignee: Calgon Carbon Corporation, Pittsburgh, Pa.

[*] Notice: The portion of the term of this patent subsequent to Nov. 29, 2011, has been disclaimed.

[21] Appl. No.: 289,234

[22] Filed: Aug. 11, 1994

Related U.S. Application Data

[63] Continuation-in-part of Ser. No. 60,590, May 19, 1993, Pat. No. 5,368,738.

[51] Int. Cl.$^6$ ................................................ C02F 1/28
[52] U.S. Cl. .................... 210/660; 210/691; 210/694
[58] Field of Search ........................ 210/660, 691, 210/684, 694, 681; 502/416, 430, 432, 433, 434

[56] References Cited

U.S. PATENT DOCUMENTS

| | | | |
|---|---|---|---|
| 4,111,842 | 9/1978 | Van Montfoort et al. | 252/447 |
| 4,154,704 | 5/1979 | Vinton et al. | 252/444 |
| 4,158,643 | 6/1979 | Sinha | 252/447 |
| 4,185,082 | 1/1980 | Sinha | 423/437 |
| 5,021,164 | 6/1991 | Gay | 210/694 |
| 5,368,738 | 11/1994 | Dussert et al. | 210/660 |
| 5,368,739 | 11/1994 | Dussert et al. | 210/660 |

Primary Examiner—Cynthia L. Nessler
Attorney, Agent, or Firm—Titus & McConomy

[57] ABSTRACT

An oxidized activated carbon having a contact pH between 7.1 and 8.2 for general use in aqueous treatment systems to prevent pH and alkalinity excursions during start-up of the system and an oxidized activated carbon having a contact pH between 6.0 and 9.5 for specific use in aqueous treatment systems to control pH and alkalinity changes during water treatment.

2 Claims, 6 Drawing Sheets

OXIDIZED ACTIVATED CARBON FOR THE CONTROL OF PH AND ALKALINITY IN WATER TREATMENT APPLICATIONS

CROSS REFERENCE TO OTHER PATENT APPLICATIONS

This is a continuation-in-part application of Ser. No. 060,590, filed May 11, 1993 U.S. Pat. No. 5,368,738.

FIELD OF THE INVENTION

The present invention relates to a process for the control of pH and alkalinity excursions prevalent during the start-up phases of activated carbon aqueous adsorption systems. More particularly, this invention relates to an oxidized activated carbon for pH and alkalinity control.

BACKGROUND OF THE INVENTION

In the start-up of activated carbon treatment for aqueous systems, it is typical to experience unacceptable increases in the pH and/or alkalinity of the effluent. As used herein, the term "alkalinity" shall mean the water's acid-neutralizing capacity and is defined as the sum of all titratable bases. These unacceptable levels of pH or alkalinity contents can last from several hours to several days. For example, excursions have been experienced for over 500 bed volumes. This effect has also been found for activated carbons already on-line and subjected to sudden changes in influent water chemistry (e.g. pH). When these excursions occur, the treated water does not meet the standards for distribution to the customer or discharge to the environment. This problem can lead to a significant loss in production, environmental problems, or expensive remedial actions.

The pH/alkalinity excursion phenomenon has been found to occur for various types of water treatment applications such as municipal water, industrial process water, ground water, and home water filter applications. It has been found to exist using various types of activated carbons such as those produced from bituminous, subbituminous, wood, coconut, peat feedstocks, or those which are acid-washed prior to use.

The presence of these pH/alkalinity excursions has been a recurring problem throughout the industry for many years. Notwithstanding the productivity losses associated with these excursions, little or nothing has been done to overcome or alleviate the problem. pH/alkalinity excursions have been largely tolerated because no solution was known to exist. Because of the growing concern for the environmental problems associated with these excursions as well as the economic losses, it is an object of the invention to provide a method for preventing or eliminating them. Accordingly, it is an object of the present invention to provide an oxidized activated carbon that is useful in preventing pH and alkalinity excursions in the start-up phase of aqueous adsorption systems.

SUMMARY OF THE INVENTION

Generally, the present invention comprises the use of a mildly oxidized activated carbon to prevent the occurrence of pH/alkalinity excursions during the purification of water. Various methods of oxidation can be used including the use of oxidizing acids. It is generally preferred to expose a granular activated carbon to an oxidizing agent, such as air or oxygen, at temperatures greater than 300 degrees C., but less than 700 degrees C., preferably between 350 degrees C. and 500 degrees C.

The oxidized activated carbon is characterized by a reduced contact pH[1], in particular a contact pH less than 8.2 but greater than 7.1. Because there are no significant changes in other commonly measured activated carbon parameters such as hardness, the preferred range is about 8.2 to 7.4. In specific cases, pH or alkalinity changes during water purification must be minimized rather than providing, for example, a generally accepted pH range of 6.5 to 8.5. For these cases, the oxidized activated carbon is characterized by a reduced contact pH, in particular a contact pH less than 9.5 but greater than 6.0. The oxidized activated carbon of the present invention is used in adsorption/filtration systems for the purification of aqueous influents. Moreover, the novel oxidized carbon can be employed to prevent pH and alkalinity excursions in the start-up of granular activated carbon (GAC) systems. Other advantages of the present invention will become apparent from a perusal of the following description of presently preferred embodiments taken in connection with the accompanying drawings.

[1] Contact pH as used herein refers to the pH of a sodium sulfate solution after a 30 minute contact with the activated carbon. This method is described hereinafter under Analytical.

PRESENTLY PREFERRED EMBODIMENTS

Experimental

Figure 1:
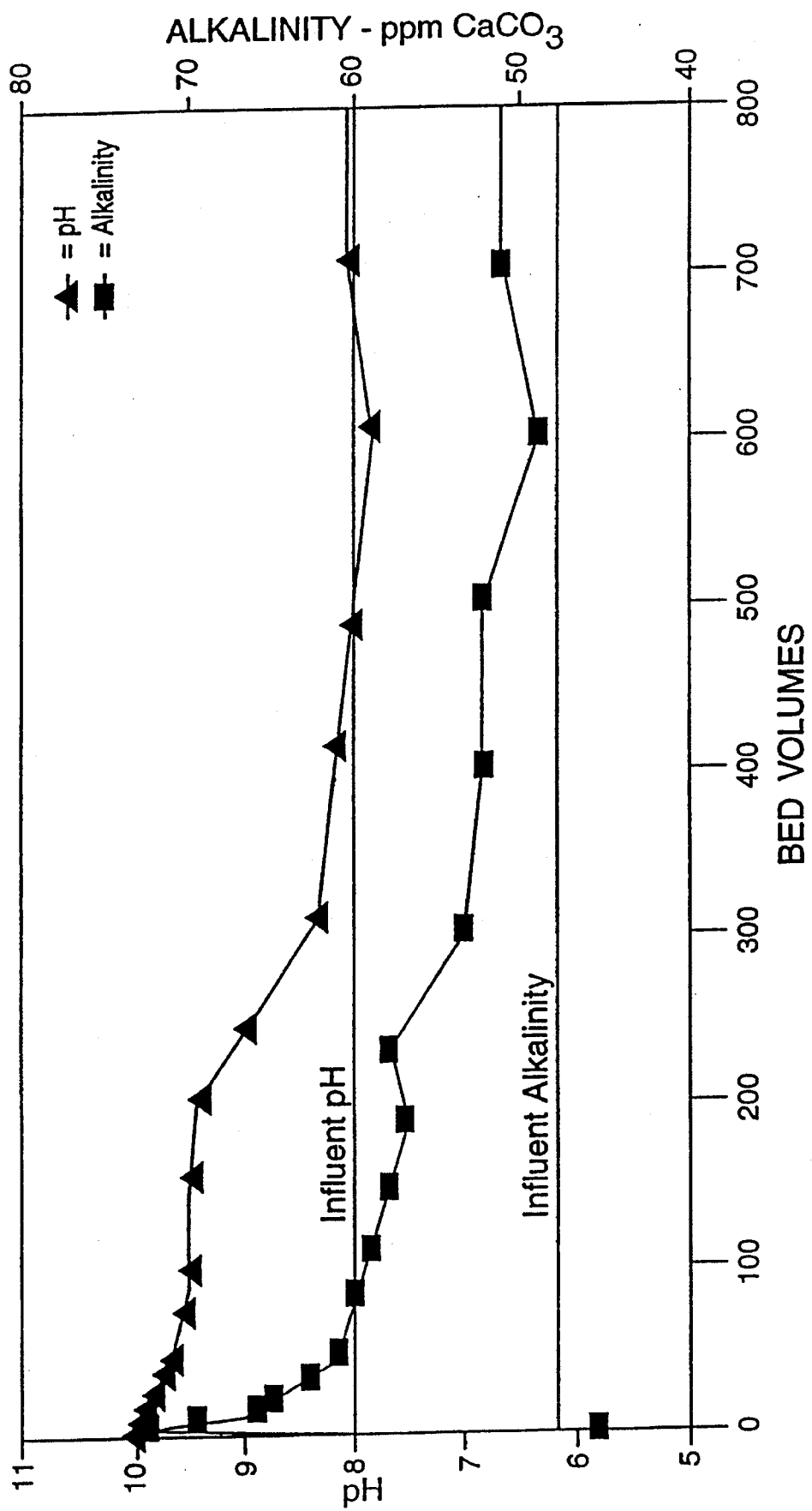
FIGS. 1 and 2 are graphical representations of the pH and alkalinity evolutions of effluents for a Type A GAC versus the number of bed volumes processed for two types of influents, respectively.

Tests were conducted with a one (1) inch inside diameter, one (1) foot long Pyrex glass column containing 60 g of granular activated carbon and using an empty bed contact time (EBCT) of 7.5 min. The carbon was boiled for fifteen (15) minutes prior to loading the column. Fines were removed by backwashing with deionized water. Runs were performed in an upflow system in order to prevent air build-up in the bed. Each test was run continuously for five days and samples of the influent and effluent were collected over time for further analysis.

Analytical pH, alkalinity and free carbonic acid concentrations were determined according to standard methods. Anions most commonly found in natural waters (sulfate, chloride, nitrate, phosphate, and fluoride) were analyzed with a Dionex Model 14 Ion Chromatograph (Dionex Corp., Sunnyvale, Calif.). The system included a precolumn (AG3, Dionex Corp.), an analytical column (AS3, Dionex Corp.), a micromembrane suppressor (AMMS, Dionex Corp.), a conductivity detector, a 0.024M sodium carbonate/ 0.003M sodium bicarbonate eluent, a 0.025N sulfuric acid regenerant and a 50 μL injection loop. Sodium, calcium, and magnesium were determined by atomic absorption.

As used herein, the contact pH value of a given activated carbon was determined by adding 25 g of GAC into a 80 mg $SO_4^-$/L sodium sulfate solution prepared in Ultrapure Milli-Q plus water (vide infra). This value was used as a test for the prediction of pH spikes. The solution was gently stirred. The solution pH was determined after a contact time of thirty (30) minutes. The standard method for determining the contact pH by adding the same amount of carbon to distilled/deionized water (no sodium sulfate added) and a contact time of five (5) minutes was found not to be effective in predicting the ability of activated carbon products to create pH excursions. Accordingly, the test described above was used.

Water Sources

Three water matrices were used for this study: (1) Robinson Township (Pa.) city (tap) water (2) St. Louis (Mo.) city (tap) water and, (3) water prepared from an Ultrapure Milli-Q Plus water system (Milli-Q system, Millipore Corp., Bedford, Mass.) having a resistivity of 18.2 micromho/cm and a dissolved organic carbon (DOC) less than 0.5 mg/L. For most of the tests presented here, Milli-Q water was treated with sodium sulfate to obtain a 80 mg sulfate/L sodium sulfate solution.

Activated Carbons

Tests were performed with a variety of commercially available activated carbons, representing most of the major Calgon Carbon and competitive liquid-phase products. The products tested originated from a wide range of raw materials. Adsorption and physical properties of the various activated carbons used in these tests are given in Table 1.

TABLE 1

Specifications of granular activated carbons (GAC) used in the tests.

| GAC type | Raw material | 1. Particle size<br>2. A.D. (g/cc)<br>3. MPD (mm) | 1. Iodine No.<br>2. Ash content (%) |
| --- | --- | --- | --- |
| A | bituminous | 1. 12 × 40<br>2. 0.562<br>3. 1.070 | 1. 880<br>2. 4.91<br>(4.2\*; 0.3\*\*) |
| B | bituminous, acid washed | 1. 12 × 40<br>2. 0.492<br>3. 1.070 | 1. 1045<br>2. 4.32 |
| C | coconut | 1. 12 × 30<br>2. 0.483<br>3. 1.090 | 1. 1245<br>2. 2.14 |
| D | pyrolyzed ion exchange resin | 1. 20 × 50<br>2. 0.513<br>3. 0.403 | 1. 1180<br>2. 0.1 |
| E | subbituminous | 1. 12 × 40<br>2. 0.485<br>3. 1.050 | 1. 1050<br>2. 8.1 |
| F | lignite | 1. 12 × 40<br>2. 0.407<br>3. 1.190 | 1. 625<br>2. 17.2 |
| G | wood | 1. 08 × 30<br>2. 0.266<br>3. 1.780 | 1. 603<br>2. 3.0 |
| H | bituminous | 1. 08 × 16<br>2. 0.456<br>3. 1.430 | 1. 768<br>2. 12.8 |
| I | wood | 1. 10 × 35<br>2. 0.212 | 1. 973<br>2. 7.3 |
| J | coconut, acid washed | 1. 16 × 40<br>2. 0.552 | 1. 1005<br>2. 0.2 |
| K | peat | 1. 08 × 30<br>2. 0.253<br>3. 1.120 | 1. 859<br>2. 5.6 |

TABLE 1-continued

Specifications of granular activated carbons (GAC) used in the tests.

| GAC type | Raw material | 1. Particle size<br>2. A.D. (g/cc)<br>3. MPD (mm) | 1. Iodine No.<br>2. Ash content (%) |
| --- | --- | --- | --- |
| L | bituminous | 1. 08 × 30<br>2. 0.488<br>3. 1.700 | 1. 922<br>2. 4.9 |
| M | bituminous | 1. 12 × 40<br>2. 0.509<br>3. 1.940 | 1. 996<br>2. 6.1 |
| N | bituminous | 1. 04 × 10<br>2. 0.490<br>3. 3.010 | 1. 1045<br>2. 6.0 |
| O | bituminous, reactivated | 1. 08 × 40<br>2. 0.574<br>3. 1.12 | 1. 878<br>2. 8.3 |

\*Acid washed with HCl
\*\*Acid washed with HF/HCl

Particle size, A.D. (apparent density), MPD (mean particle diameter), Iodine No., and Ash content were determined according to Calgon Carbon test methods number 8, 7, 9, 4, and 5, respectively.

Carbon Oxidation According to the Invention

Oxidized Type A carbon (Filtrasorb F200 manufactured by Calgon Carbon Corporation) was prepared by treating the carbon with air at temperatures greater than 300 degrees C., but less than 700 degrees C., preferably between 350 degrees C. and 500 degrees C. The carbon was oxidized for a time greater than 5 minutes, but less than 3 hours. A charge of 250 to 1,000 gms of carbon was introduced in a 6 or 12-inch diameter rotary kiln. The carbon was oxidized with air or oxygen at flow rates between 2.5 and 50 l/min, and at rotation speeds ranging from 1 to 10 rpm.

OXIDIZED ACTIVATED CARBON FOR THE CONTROL OF PH AND ALKALINITY IN WATER TREATMENT APPLICATIONS

Figure 2:
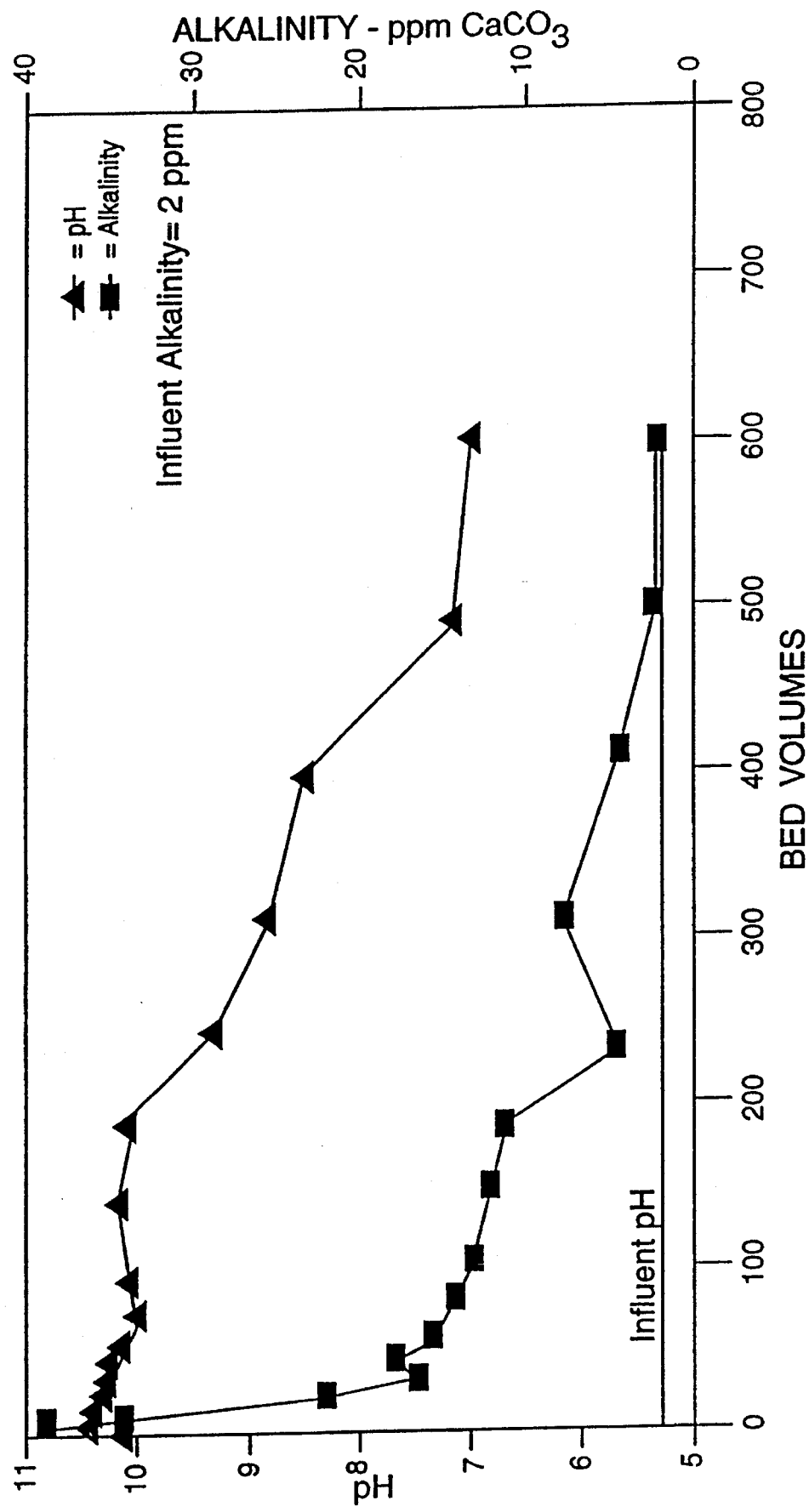

Effluent pH values were above the Safe Drinking Water Act Secondary Maximum Contaminant Level (8.5) for more than 350 bed volumes when various types of water (tap and synthetic waters) were processed through a Type A GAC bed typically used for water treatment applications (Filtrasorb 200, Calgon Carbon Corporation, Pittsburgh, Pa.). Alkalinity values followed a similar pattern, with effluent values greater than influent values by 5 to 30 mg/l for the same duration. Results are plotted on FIGS. 1 and 2 for two types of water: (1) tap water, and (2) synthetic sodium sulfate solution prepared in ultrapure Milli-Q water (influent pH=6.0). Similar plots were obtained with synthetic solutions of sodium chloride, sodium nitrate and sodium acetate.

The presence of anions commonly found in natural waters, such as sulfate, chloride and nitrate, was found to trigger the effect. No significant pH/alkalinity excursion was reported when anion-free Milli-Q water was processed through the carbon bed, or when GAC treatment was preceded by ion exchange treatment.

pH and alkalinity excursions were accompanied by a partial anion removal from the solution. Capacities of the activated carbons exhibiting pH spikes for sulfate, chloride, and nitrate ranged from 2 to 9 mg/g GAC, depending on the water characteristics (e.g. pH and presence of other anionic species), the carbon type, and the nature and concentration of the anion. The capacity sequence was found to be $SO_4^- > NO_3^- > Cl^-$.

For a given carbon, the presence and extent of pH excursions were not significantly dependent on the water matrix quality. For instance, the effect was similar in intensity and duration for tap waters characterized by different inorganic contents and for synthetic solutions of sodium sulfate (80 mg sulfate/L), sodium chloride (18 mg chloride/L) or sodium nitrate (10 mg nitrate/L). There was a threshold anion concentration (approximately 10 mg/L for most common anions encountered in natural waters—sulfate, chloride, nitrate) above which the effect was no longer concentration dependent. This threshold content is likely to be present in most natural waters to be treated. Moreover, anion concentrations as low as 1 mg $SO_4^-$/L or 5 mg $NO_3^-$/L were able to trigger significant, although less intense, pH spikes.

The ash content of activated carbon did not contribute significantly to the effect. Significant pH excursions occurred with low ash coconut and acid washed bituminous based carbons. Moreover, a thorough acid-washing procedure of a bituminous based carbon (leading to an ash content as low as 0.3% compared to 5.0% initially) did not significantly shorten the effect.

Figure 3:
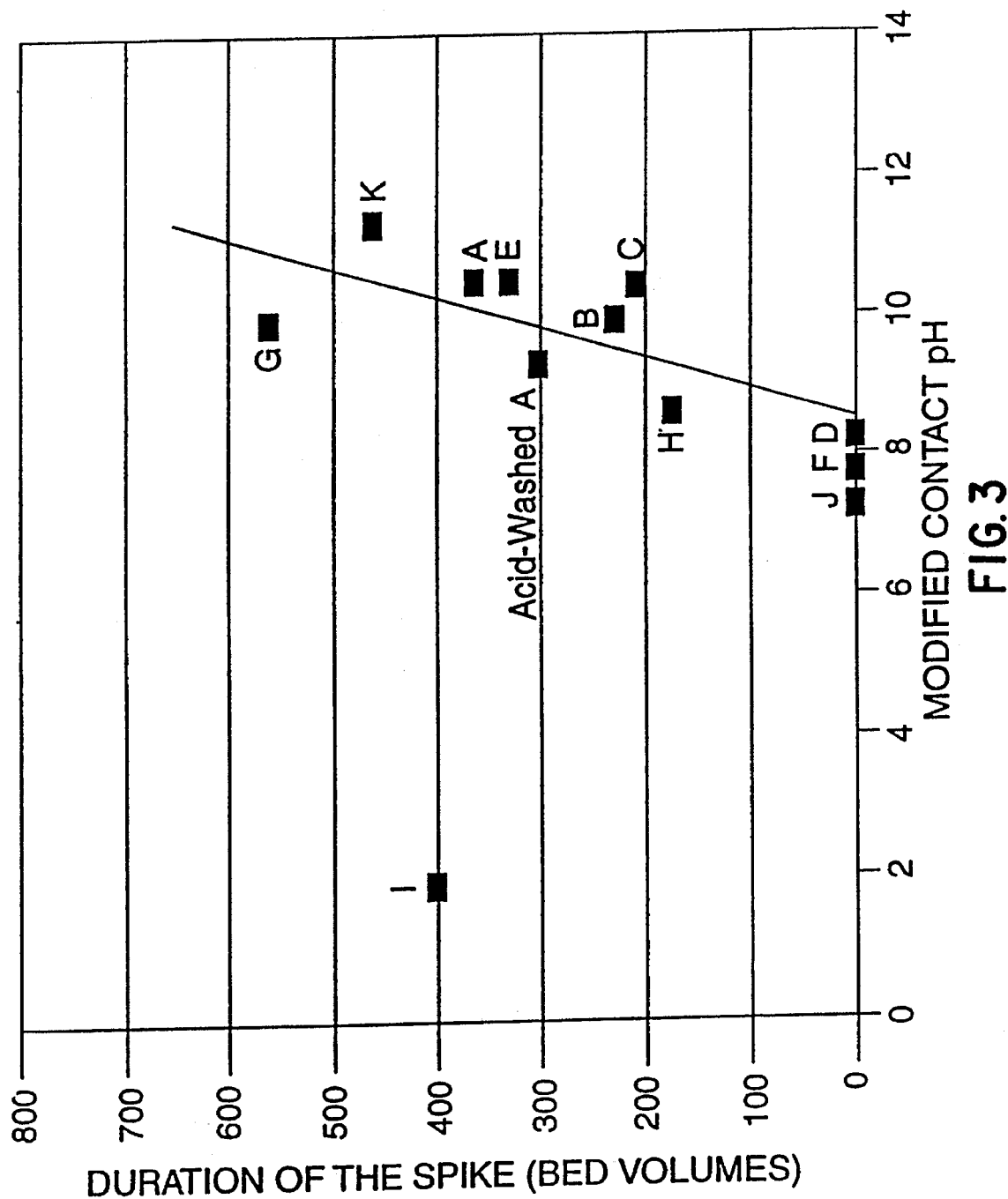
FIG. 3 is a graphical representation of the intensity of the pH excursion versus the modified contact pH of a given carbon determined with a sodium sulfate solution influent (80 mg sulfate/L spiked in ultrapure water)

The ability of a given activated carbon to exhibit pH excursions could be predicted by the measurement of its contact pH (using the modified test method). Granular activated carbons with a modified contact pH value greater than 8.2 were found to trigger pH and alkalinity spikes when placed on-line for water treatment. Most activated carbons tested were characterized by high contact pH's and exhibited significant pH excursions. The relationship between modified contact pH and pH excursion is given in Table 2 and plotted on FIG. 3.

TABLE 2

Presence and intensity of pH excursions versus the contact pH of activated carbon.

| GAC type | Contact pH | pH spike (Y/N) | Duration (BV) | Sulfate capacity (mg/g GAC) |
|---|---|---|---|---|
| A | 10.35 | Y | 350–400 | 4.5-7.5 |
| A* | 9.2 | Y | 300 | 5.3 |
| A** | 9.1 | Y | 250–300 | 5.2 |
| B | 9.8 | Y | 200–250 | 4.9 |
| C | 10.35 | Y | 200–250 | 3 |
| E | 10.4 | Y | 350 | 6.9 |
| G | 9.6 | Y | 550 | 3.8 |
| H | 8.6 | Y | 170 | 2.6 |
| K | 11.1 | Y | 460 | 4.6 |
| D | 8.2 | N | 0 | 0.7 |
| F | 7.8 | N | 0 | 1.7 |
| I | 2.1 | N | 0 | 0.5 |
| J | 7.4 | N | 0 | 0.5 |

*Acid washed with HCl
**Acid washed with HF/HCl

The presence and intensity of pH excursions were determined with a sodium sulfate solution (80 mg sulfate/L) prepared in ultrapure Milli-Q water.

Activated carbon products that did not exhibit pH excursions did not significantly remove sulfate ions from water (Table 2).

Several bituminous based activated carbons (F200 (A), F300 (L), F400 (M), BPL (N), Calgon Carbon Corporation), a reactivated product O (Calgon Carbon Corporation) and a coconut based carbon PCB (C) (Calgon Carbon Corporation) were, thus, air-oxidized according to the procedure described above. After treatment, the carbons were analyzed for their resulting modified contact pH and conventional column tests were conducted.

TABLE 3

Oxidized activated carbons for the conntrol of pH/Alkalinity.

| GAC type | Contact pH before treatment | Contact pH after treatment |
|---|---|---|
| A | 10.35 | 7.4 (T1) |
|   |       | 7.1 (T2) |
| L | 11.2 | 7.7 |
| M | 11.1 | 7.4 |
| C | 10.5 | 7.7 |
| N | 10.8 | 7.4 |
| O | 11.8 | 7.5 |

T1 and T2 are two different oxidation temperatures between 300 and 700 degrees C.

Figure 4:
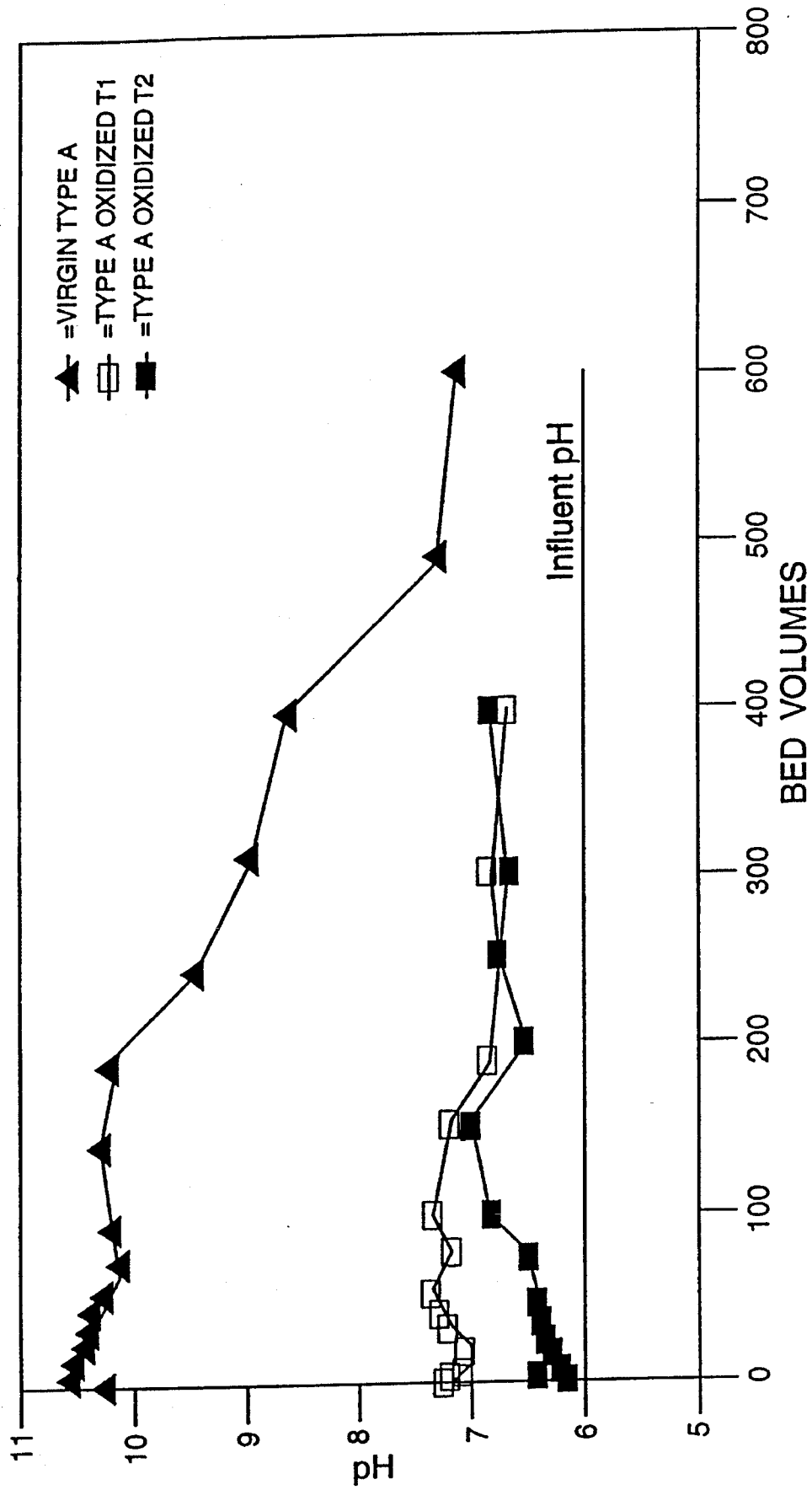
FIG. 4 is a graphical representation of the evolution of the effluent pH versus the number of bed volumes processed for a Type A carbon before treatment and after treatment at two different temperatures using an aqueous system containing sodium sulfate.

Contact pH's are presented in Table 3 for all carbons tested, before and after treatment. The modified contact pHs of these air-oxidized carbons dropped significantly and were below 8.2, demonstrating a successful treatment. The pH profiles are presented in FIG. 4 for Type A GAC, before and after treatment at two different temperatures (T1 and T2, respectively). No significant pH or alkalinity rises occurred with oxidized activated carbons. As expected, column tests performed for oxidized F200 showed that the anion exchange capacity of the carbon was drastically reduced after oxidation (to 2.5 and 1.0 mg/g for T1 and T2, respectively).

The physical properties of the F200 activated carbon were not significantly modified under mild oxidation conditions and the obtainment of a contact pH between 7.6 and 8.2. The particle size, apparent density and ash content were similar before and after treatment. Process yields were greater than 98%. Reductions in abrasion numbers were less than three units. Iodine numbers were reduced by 30 to 60 units.

Figure 5:
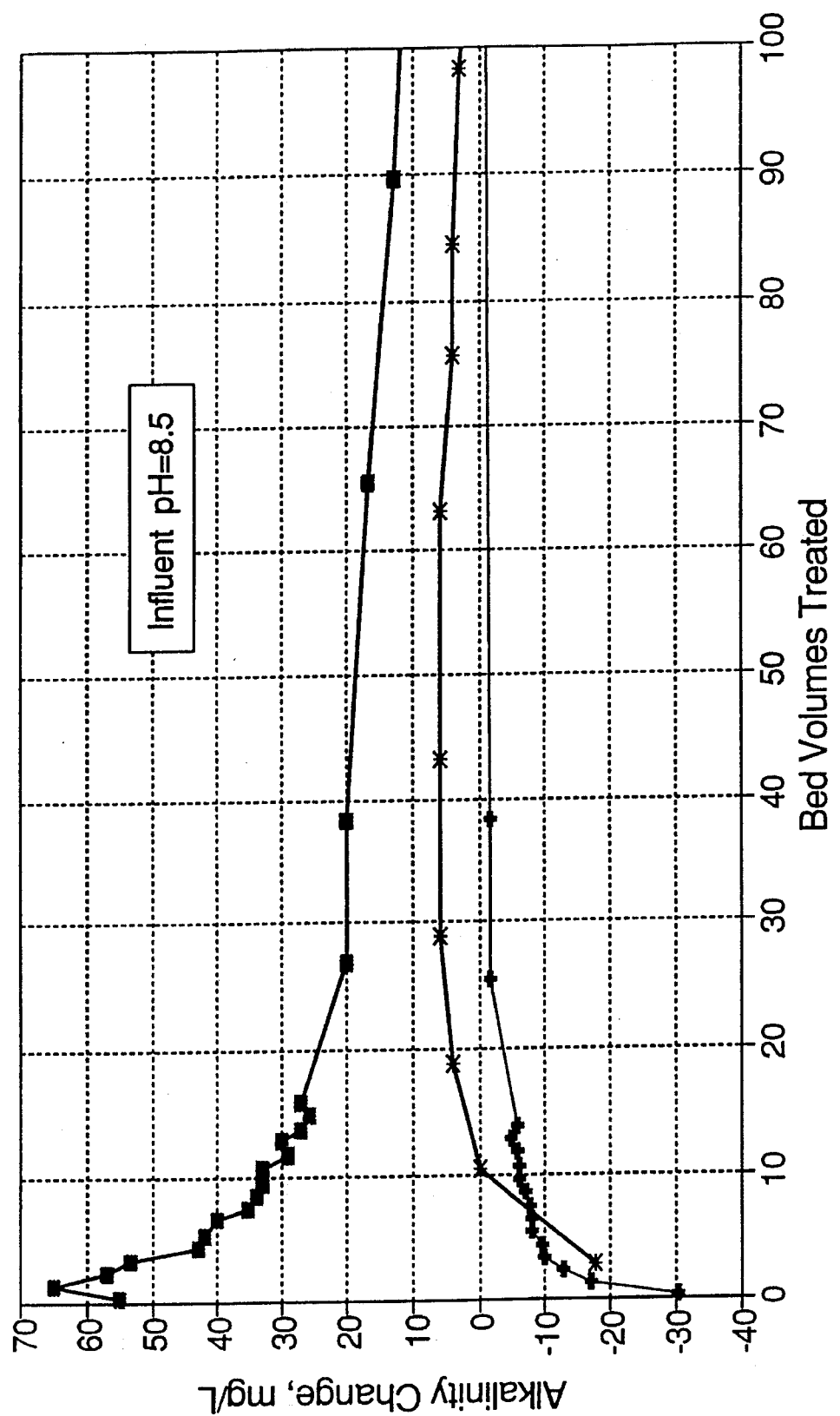
FIGS. 5 and 6 are graphical representations of the alkalinity evolution versus the number of bed volumes processed for a Type A carbon before treatment and for oxidized carbon after treatment at two different contact pH's.
Figure 6:
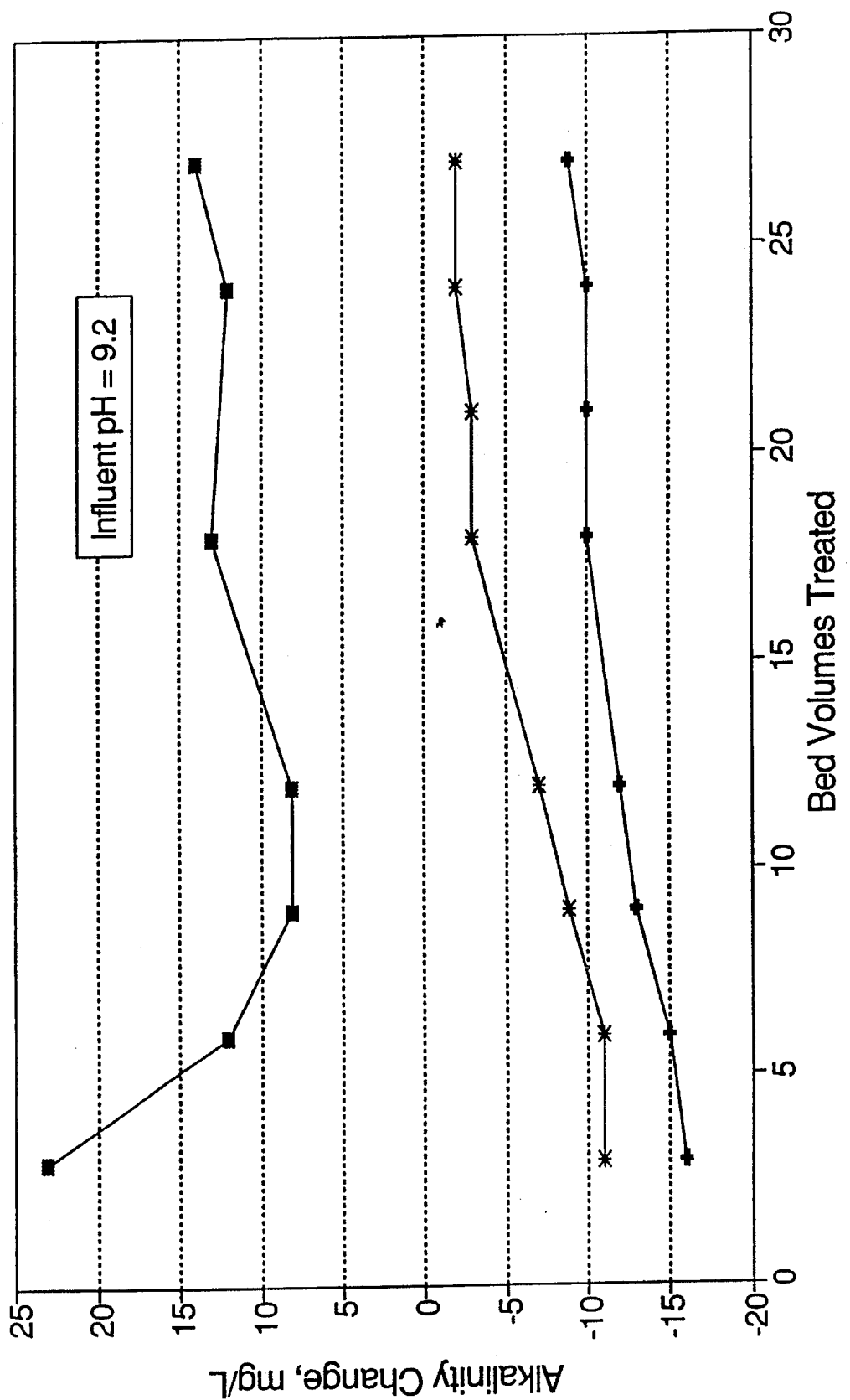

To best control the pH and alkalinity, the contact pH of the treated carbon should closely approximate that of the water to be purified. The alkalinity profile in FIG. 5 shows that the oxidized carbon at pH=7.8 controls the alkalinity better for Robinson Township water with a pH of 8.5 than does an oxidized carbon at pH=9.0 or the virgin carbon. Further, for a high pH water (City of St. Louis) at 9.2, the oxidized carbon at pH=9.0 controls alkalinity better than the virgin carbon or oxidized carbon at pH=7.8.

While presently preferred embodiments of the invention are described in particularity, the invention may be otherwise embodied within the scope of the appended claims.

What is claimed is:

1. In a method for treating water with activated carbon, the improvement comprising controlling pH and alkalinity changes during operation of said water treatment by contacting said water with an oxidized activated carbon having a contact pH below 9.5.

2. In a method of claim 1 wherein said oxidized carbon has a contact pH between about 6.0 and 9.5.

* * * * *